United States Patent [19]
Flint

[11] 4,074,853
[45] Feb. 21, 1978

[54] DUAL FUNCTION PROBE

[75] Inventor: John R. Flint, Barrington, Ill.

[73] Assignee: Bell & Howell Company, Chicago, Ill.

[21] Appl. No.: 738,421

[22] Filed: Nov. 3, 1976

[51] Int. Cl.$^2$ .................... G06K 13/26; G06K 19/06; G03B 23/12

[52] U.S. Cl. .................................. 235/477; 235/494; 353/26 A

[58] Field of Search ................ 235/61.11 E, 61.11 R, 235/61.7 R; 250/555, 568, 570; 353/25, 26

[56] References Cited

U.S. PATENT DOCUMENTS

| | | | |
|---|---|---|---|
| 2,749,533 | 6/1956 | Daniels | 235/61.11 E |
| 2,782,398 | 2/1957 | West et al. | 235/61.11 E |
| 2,820,907 | 1/1958 | Silverman | 235/61.11 E |
| 3,757,091 | 9/1973 | Baker | 235/61.11 E |
| 3,835,297 | 9/1974 | Inove et al. | 235/61.11 E |

*Primary Examiner*—Daryl W. Cook
*Attorney, Agent, or Firm*—Robert A. Walsh

[57] ABSTRACT

The disclosure relates to a control system for use in an information retrieval system. The control system adapts the retrieval system for locating a preselected information bearing element wherein the information bearing elements comprise a first set of elements numbered consecutively in a first direction for identification and a second set of elements numbered consecutively in a second direction for identification and wherein each element of the first set is associated with an identifiable marker comprising a first set of markers and each element of the second set is associated with an identifiable marker comprising a second set of markers. The control system includes a marker sensor for sensing the first and second sets of markers, a marker sensor detector for detecting which set of markers is being sensed and interface means for selectively coupling the marker sensor to the retrieval system counter in response to the detector to enable the counter to maintain the location of the elements as the elements are driven. The control system also adapts the retrieval system for locating a preselected group of elements and a preselected element in the preselected group where the elements are divided in a plurality of consecutively numbered groups and the elements within each group are consecutively numbered for identification.

9 Claims, 12 Drawing Figures

DUAL FUNCTION PROBE

BACKGROUND OF THE INVENTION

The present invention is generally directed to an information retrieval system of the type which automatically retrieves selected information bearing elements for inspection. The present invention is more particularly directed to the control and marker sensing system for an automatic film searching and retrieval system for use with film having a plurality of consecutively numbered frames, and wherein each frame includes an information image and an adjacent frame marker.

Information retrieval systems are well known. One efficient type of retrieval system that has found widespread acceptance is often referred to as a microfilm retrieval system. In such systems, copies of documents and/or data are recorded on film such as 16 mm. film wherein each film frame comprises an information bearing element. With the size of the film frame being on the order of 1 mm. per document inch, such size reduction affords a substantial savings in information storage volume and greatly simplifies handling of the information. Such a reduction in size necesarily precludes direct reading of the information bearing elements. The usual procedure for reading them is to project the film frame images onto a screen and to magnify them to a size corresponding approximately to the original size of the information document that is recorded.

Because literally thousands of information bearing elements or film frames comprise a roll of microfilm, searching for a particular image film frame can be time consuming. As an example, microfilm reels are known to include information bearing elements or frames on the order of 40,000 frames per reel. To provide ready access to a preselected information bearing element or film frame, automatic search techniques have been developed in the form of automatic retrieval systems.

In such systems, the film frames of the microfiln reels are numbered consecutively for identification and each film frame has an adjacent marker which may be counted and the identification numbers displayed. Hence, during the search cycle, the counter provides the current number of film frames currently being sensed and at the end of a scan cycle, provides the current number of the film frame being inspected.

Retrieval systems also include a means for entering a target number which identifies the film frame to be inspected. Suitable logic control within the retrieval systems determine from the current number and the target number whether the film is to be driven in an up direction or a down direction to arrive at the preselected film frame to be inspected.

Retrieval systems of the prior art have been generally successful in locating preselected information bearing elements or film frames for inspection where the microfilm includes only one set of film frames which are consecutively numbered for identification and wherein each film frame is associated with an identifiable marker. However, additional microfilm formats have been developed to greatly increase the number of information bearing elements or film frames which may be contained upon a microfilm reel and formates wherein the film frames are divided into groups or batches wherein the first film frame of each group is associated with a group identification marker and wherein the film frames comprising each group are consecutively numbered for identification within each group.

In the format wherein an increased number of film frames are contained upon a microfilm reel, first and second sets of information bearing elements or film frames are provided. The first set of film frames are generally located at the top half of the film and each film frame of the first set is numbered consecutively for identification in increasing order as the film is driven in a first direction. A second set of film frames is provided in the bottom half of the microfilm and the film frames comprising the second set are consecutively numbered but in increasing order when the film is driven in a second direction which is opposite from the first direction. Each film frame of the first set is associated with an identifiable marker comprising a first set of markers at the top edge of the microfilm and each film frame comprising the second set of film frames is associated with an identifiable marker at the bottom edge of the microfilm and comprise a second set of identifiable markers. Since the first set of markers are at the top edge of the microfilm and the second set of the markers are at the bottom edge of the microfilm, the first and second sets of the markers are spaced apart. This format is generally referred to as the "Duo-Duplex" format.

When the film frames are divided into groups or batches, each group or batch includes a plurality of image film frames. The first film frame of each group or batch is associated with an identifiable group marker which is located at the bottom edge of the film. Each film frame of each group is associated with an identifiable marker which is at the top edge of the film. The groups are consecutively numbered as are the film frames in each group. Thus, the group identifiable markers may be considered a second set of markers and the markers associated with each film frame may be considered a first set of markers. With the first set of markers being at the top edge of the film and with the second set being at the bottom edge of the film, the first and second sets of markers are also spaced apart.

It is, therefore, a general object of the present invention to provide a new and improved control and marker sensing system for an automatic film searching and retrieval system which adapts the system for locating a preselected film frame wherein the film frames are arranged in the standard format including a single set of film frames associated with identifiable markers, in the Duo-Duplex format having first and second sets of film frames and first and second sets of identifiable markers, and in the batch format wherein the film frames are divided into a plurality of batches.

It is a more particular object of the present invention to provide a control and marker sensing system for an automatic film searching and retrieval system which includes a marker sensor for sensing first and second sets of identifiable markers, a detector for detecting which set of markers is being sensed, and interface means for selectively coupling the marker sensor to the system counter responsive to the detector to thereby cause the counter to maintain the accurate location of the film frames regardless of the direction in which the film frames are being driven.

It is a still more particular object of the present invention to provide a control system for an automatic film searching and retrieval system which adapts the system for locating a preselected group of film frames and a preselected film frame within the preselected film frame group.

SUMMARY OF THE INVENTION

The invention provides in an information retrieval system of the type which automatically locates preselected information bearing elements for inspection wherein the system includes drive means for driving the elements in first and second directions, wherein the information bearing elements are consecutively numbered for identification and comprise a first set of elements having increasing identification numbers when driven in the first direction and the second set of elements having increasing identification numbers when driven in the second direction, wherein each element is associated with a corresponding identifiable marker with the markers associated with the first set of elements being in aligned relation and comprising a first set of markers and the markers associated with the second set of elements being in aligned relation, spaced from the first set of markers, and comprising a second set of markers, and wherein the system includes a counting means for counting the elements for maintaining the location of the elements as the elements are driven, the improvement of a marker sensing system for sensing the first and second sets of markers and for properly controlling the drive means and the counting means. The sensing and control system comprises a marker sensor for sensing the first and second sets of markers and for providing up counting pulses and down counting pulses as the elements are driven, a marker sensor detector for detecting which set of markers is being sensed, and first interface means coupled to the detector and selectively coupling the marker sensor to the counting means responsive to the detector for applying the up counting pulses to the counting means when the sensing means is sensing the first set of markers and as the elements are driven in the first direction, for applying the down counting pulses to the counting means when the sensing means is sensing the first set of markers and as the elements are driven in the second direction, for applying the up counting pulses to the counting means when the sensing means is sensing the second set of markers and as the elements are driven in the second direction and for applying the down counting pulses to the counting means when the sensing means is sensing the second set of markers and as the elements are driven in the first direction.

The present invention also provides in an information retrieval system of the type which locates selected information bearing elements for inspection, wherein the elements are numbered for identification and wherein the system includes a storage means for storing the identification number of the selected element to be inspected as a target number, drive means for driving the elements in first and second directions, a plural digit counter for counting the elements as they are driven and for providing current numbers, and a plural digit comparator for comparing the target number to the current number and for stopping the drive means when the current number is equal to the target number, the improvement of a control system for locating a desired individual group of elements from a plurality of such groups and thereafter, a selected element from a plurality of elements comprising the desired group, wherein the information bearing elements are grouped with the first element of each group being associated with an identifiable group marker, wherein the groups are assigned consecutive group numbers for identification, wherein the elements of each group are assigned consecutive numbers for identification within each group, wherein each element is associated with an element identifiable marker, wherein the element markers comprise a first set of markers and the group markers comprise a second set of markers, and wherein the first and second sets of markers are spaced apart. The control system comprises a marker sensor for sensing the first and second sets of markers and for providing up counting pulses and down counting pulses as the elements are driven, a marker sensor detector for detecting which of the markers is being sensed for providing a first signal when the marker sensor is sensing the first set of markers, and counter select means coupled to the marker sensor detector for dividing the plural digit counter into a first counter and a second counter, for coupling the marker sensor to the first counter responsive to the first signal, and for coupling the marker sensor to the second counter responsive to the second signal. The control system additionally comprises a comparator select means coupled to the marker sensor detector for dividing the plural digit comparator into a first comparator and a second comparator, the first comparator being coupled to the first counter for receiving the current elements numbers, to the storage means for receiving the element target number, and having an output coupled to the drive means by the comparator select means responsive to the first signal, and the second comparator being coupled to the second counter for receiving the current group numbers, to the storage means for receiving the group target number, and having an output coupled to the drive means by the comparator select means responsive to the second signal. As a result, when the marker sensor senses the second set of markers to locate a selected group of elements, the marker sensor detector provides the second signal to cause the second counter, the second comparator, the storage means, and the drive means to locate the selected group of elements, and when the marker sensor senses the first set of markers to locate a selected element within the selected group, the marker sensor detector provides the first signal to cause the first counter, the first comparator, the storage means and the drive means to locate the selected element within the selected group.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals identify like elements, and in which:

DESCRIPTION OF THE PREFERRED EMBODIMENT

Figure 1:
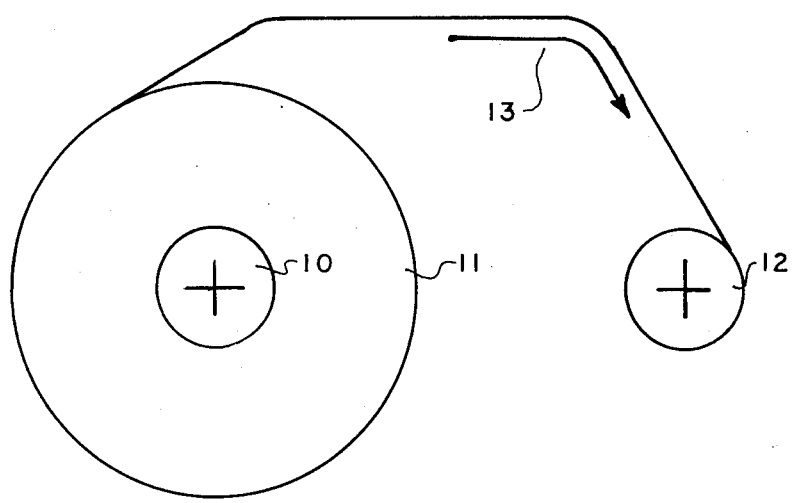
FIG. 1 is a schematic representation of a reel of microfilm and a take-up reel which may be utilized in practicing the present invention.

Referring now to FIG. 1, there is shown in schematic form a reel of 16 mm. film and a take-up spool which may be utilized in practicing the present invention. The reel of film includes a supply spool 10 about which is wound the film 11. The film as shown runs from the supply spool 10 to the take-up spool 12. The arrow 13 indicates the direction of film drive, which is from left to right, and which is designated a first drive direction or the forward direction. As previously explained, the film frames of film 11 are consecutively numbered for identification. As the film moves in the direction of arrow 13, the film is being driven so that the identification numbers of the film frames increase. Obviously, if the film is driven in a second or reverse direction in opposition to the direction shown by arrow 13, the film frames will be driven such that the identification numbers decrease.

Figure 2A:
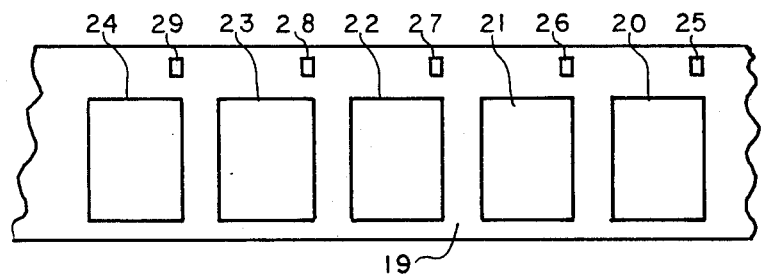
FIG. 2A is a partial plan view of film having thereon film frame images arranged in the standard format consisting of a single group of film frame images arranged in the standard format consisting of a single group of film frame images.

Referring now to FIG. 2A, there is shown a partial view of a portion of 16 mm. film having film frames arranged in the standard format comprising a single set of aligned images 20-24. Each of the images 20-24 has an associated identifiable marker 25-29 respectively which are located at the top edge of the film 19. The images are assigned consecutive identification numbers which increase as the film is driven in the forward or first direction. The identifiable markers 25-29 are aligned with the leading edge of the images as shown.

The film frame markers may be sensed by a marker sensor constructed in a manner fully taught by U.S. Pat. No. 3,941,978, which issued Mar. 2, 1976, in the names of James E. Huston and Robert W. Murre, which patent is assigned to the assignee of the present invention. As taught in that patent, each identifiable marker constitutes a marker window which operates in association with a pair of light pipes. The light projected through the light pipes is detected by a pair of photo sensors which generate an output responsive to the light being sensed. As a result, a first wave form is provided when the film is driven in the first or forward direction and a second wave form is provided when the film is driven in a second or reverse direction. As a result, the images are not only sensed for counting, but additionally, the direction in which the film is being driven is discernible so that a pulse may be delivered to the up input of an up/down counter as a marker is sensed while the film is driven in the forward direction and a pulse may be delivered to the down input of an up/down counter when a marker is sensed as the film is being driven in the reverse direction. An improved marker sensor will be described hereinafter in relation to FIG. 9 wherein a similar technique is utilized.

Figure 2B:
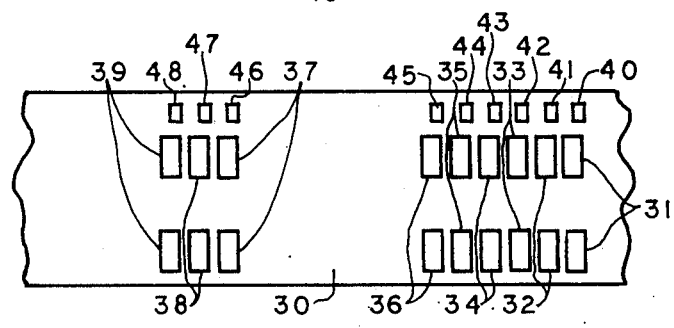
FIG. 2B is a partial plan view of film having thereon film frame images arranged in the standard format consisting of a single group of image film frames but wherein the front and back sides of the information documents are provided.

FIG. 2B shows a portion of 16 mm. film 30 which also has images thereon arranged in the standard format. The images are arranged in image pairs 31-39 wherein each pair is associated with an identifiable marker 40-48 respectively. The top image of each pair may, for example, be the image of the front side of a check and the bottom image may be the image of the back side of the same check. The identifiable marker 40-48 as in the case of the identifiable markers 25-29 of FIG. 2A are located at the top edge of the film 30 and are aligned with the leading edge of the images 31-39. The image pairs are assigned consecutive numbers for identification, which numbers are assigned in increasing order from right to left. Thus, as the film is driven from the left to the right or in the forward direction, the film is being driven in a direction for increasing identification image numbers.

Figure 2C:
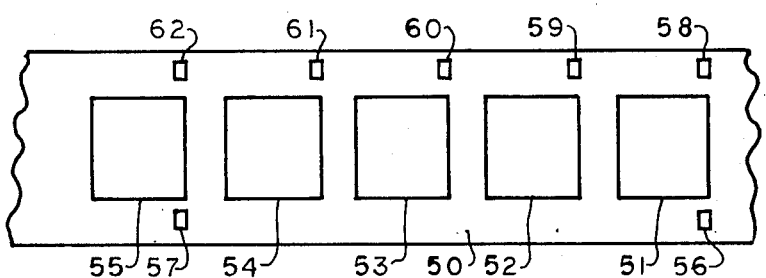
FIG. 2C is a partial plan view of film having thereon film frame images arranged in groups with group identifiable markers and element identifiable markers.

FIG. 2C shows a portion of a 16 mm. film 50 which has thereon document images which are arranged in groups. For example, images 51-54 comprise one group of images, and image 55 is the first image in the next group. At the bottom of the film are located group identifiable markers 56 and 57. These markers comprise a second set of markers. Marker 56 is associated with a group of images 51-54 and marker 57 is associated with the group of images which include image 55. The groups are numbered for identification consecutively and in increasing order from right to left. Thus, marker 56 represents a group $n$, and marker 57 represents another group $n+1$.

Each image within each group is numbered consecutively and is associated with an image identifiable marker 58-62. Markers 58-62 comprise a first set of markers and are located at the top edge of the film. Each marker of the second set is also aligned with the leading edge of its associated image. In its preferred form, the images within each group are consecutively numbered in increasing order from the right to the left beginning with the number "1".

As a result of this format, markers 56 and 57 may be utilized for locating a preselected group or batch of images and markers 58-62 may be utilized for locating a preselected image within the preselected group or batch of images.

Figure 2D:
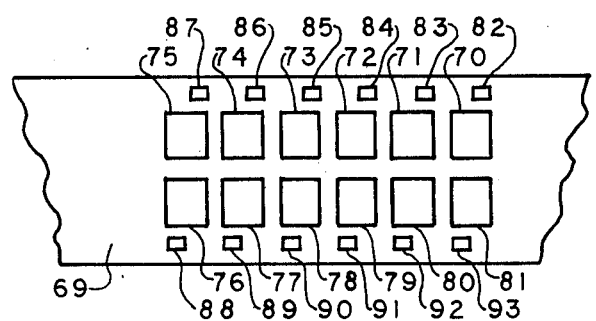
FIG. 2D is a partial plan view of film having thereon film frame images arranged in the Duo-Duplex format.

Referring now to FIG. 2D, FIG. 2D shows a portion of a 16 mm. film 69 having information bearing elements or document images thereon arranged in the Duo-Duplex format. The images are arranged to comprise a first set of images 70-75 and a second set of images 76-81. Each of the images 70-75 of the first set are associated with a corresponding identifiable marker 82-87 respectively which comprises a first set of identifiable markers. In a like manner, each image of the second set 76-81 has an associated corresponding identifiable marker 88-93 and comprises a second set of identifiable markers.

Each image is assigned a number for identification. The images 70-75 comprising the first set of images are numbered consecutively in increasing order from the right to the left. The images 76-81 comprising the second set of images are numbered in increasing order from the left to the right. In a corresponding manner, the first set of identifiable markers 82 and 87 are aligned with the leading edge of the first set of images 70-75 respectively and the identifiable markers 88-93 comprising the second set of markers are aligned with the leading edge of the second set of images 76-81. The first set of markers are located at the top edge of the film 69 and the second set of markers are located at the bottom edge of the film. Thus, the first set of markers and second set of markers are spaced apart.

As a result of the formats of the 16 mm. film shown in FIG. 2C and FIG. 2D, it is necessary for an automatic film searching and retrieval system to sense both sets of markers. In the case when a particular group of images is to be located, the marker sensor of the automatic film searching and retrieval system must sense the second set of markers at the bottom edge of the film in order to locate the desired group, and then to sense the first set of markers at the top edge of the film to locate the desired image within the desired group. In the case of the Duo-Duplex format type 16 mm. film, when it is necessary to locate a preselected image which comprises the first set of images, the marker sensor of the automatic film searching and retrieval system must be able to sense the first set of markers at the top edge of the film and when it is necessary to locate the desired image which is in the second set of images it is necessary for the marker sensor to sense the second set of markers at the bottom edge of the film. In this last case, it is also necessary to reverse the drive direction control of the system and to properly apply the up and down counting pulses provided by the marker sensor to the system counter so that when the first set of markers is being sensed, the counter receives an up pulse as the film is driven from the left to the right. Conversely, when the second set of markers is being sensed, it is necessary to interconnect the marker sensor and system counter so that the system counter receives down counting pulses as the film is driven from the left to the right and up counting pulses as the film is driven from the right to the left.

Figure 9:
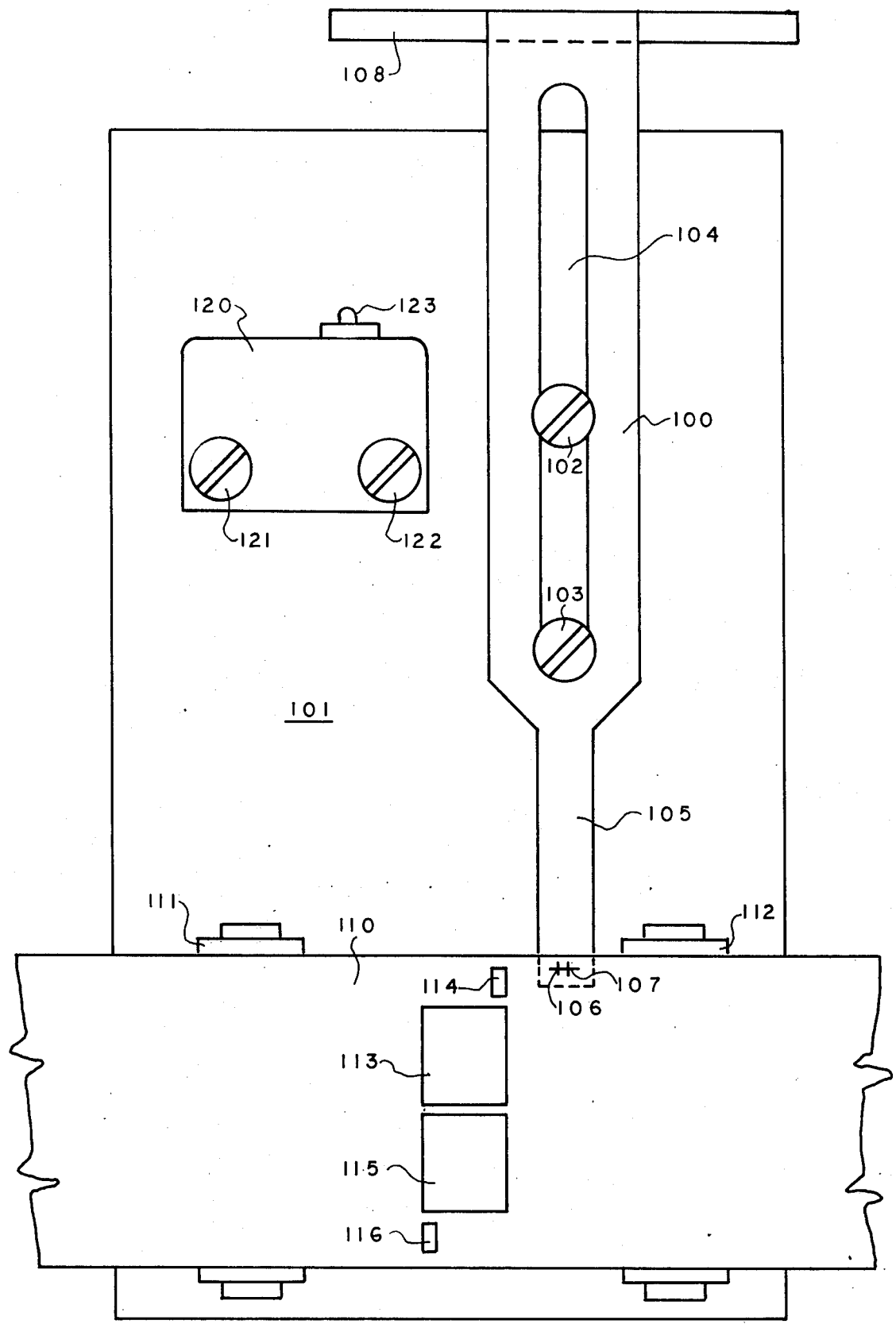
FIG. 9 is a front plan view of a marker sensor which may comprise the dual probe of FIG. 3 and which may be utilized in practicing the present invention.

A marker sensor which embodies the present invention and which may be utilized in sensing the first and second sets of markers is shown in FIG. 9. The marker sensor of FIG. 9 includes a slotted member 100 which is slidably mounted on a vertical support plate 101 by screws 102 and 103. The screws 102 and 103 extend through the slot 104 of member 100 and allow the member 100 to be vertically displaced up and down. Member 100 as shown in FIG. 9 is in the up or first position.

Member 100 includes an extension 105 which has at its bottom end a pair of light detectors 106 and 107. A film 110 of the Duo-Duplex type is shown mounted in position for use. Rollers 111 and 112 support film 110 so that the extension 105 of member 100 is beneath the film 110.

The film 110 includes an image 113 and a corresponding marker 114 which may comprise one of the first set of images and markers as shown in FIG. 2D. Film 110 has another image 115 with a corresponding marker 116 which may comprise one of the second set of images and markers as shown in FIG. 2D.

Associated with the marker sensor is a microswitch 120 which is mounted on vertical plate 101 by screws 121 and 122. The microswitch 120 has an operating plunger 123.

When member 100 is in the up or first position as shown, the light sensors 106 and 107 are aligned with marker 114 of the first set of markers for sensing the first set of markers as the film 110 is driven. When member 100 is lowered to its lowered or second position, the light sensors 106 and 107 will be aligned with marker 116 of the second set of markers for sensing the second set of markers as the film is driven. When member 100 is lowered to enable the sensing of the second set of markers, projection 108 contacts operating plunger 123 and closes microswitch 120. Microswitch 120 will thereby provide a signal indicating that the second set of markers is being sensed. For example, microswitch 120 may be coupled to a suitable voltage source and a dropping resistor such that when its operating plunger 123 is up opening microswitch 120, it will provide the system logic with a logical 1 level signal. When the sensor is lowered to sense the second set of markers, operating plunger 123 will be down, closing the microswitch and grounding the voltage source through the dropping resistor to provide a logical 0 signal to be used by the system logic indicating that the second set of markers is being sensed.

While the marker sensor of FIG. 9 is shown in the form of a movable sensor, it must be understood that a pair of sensors may be utilized where one sensor is aligned with the first set of markers and the other sensor is aligned with the second set of markers. In this type of system, the proper sensor may be selected through logic control and a suitable marker sensor detector may detect which sensor is operative to thereby detect which set of markers is being sensed.

Figure 3:
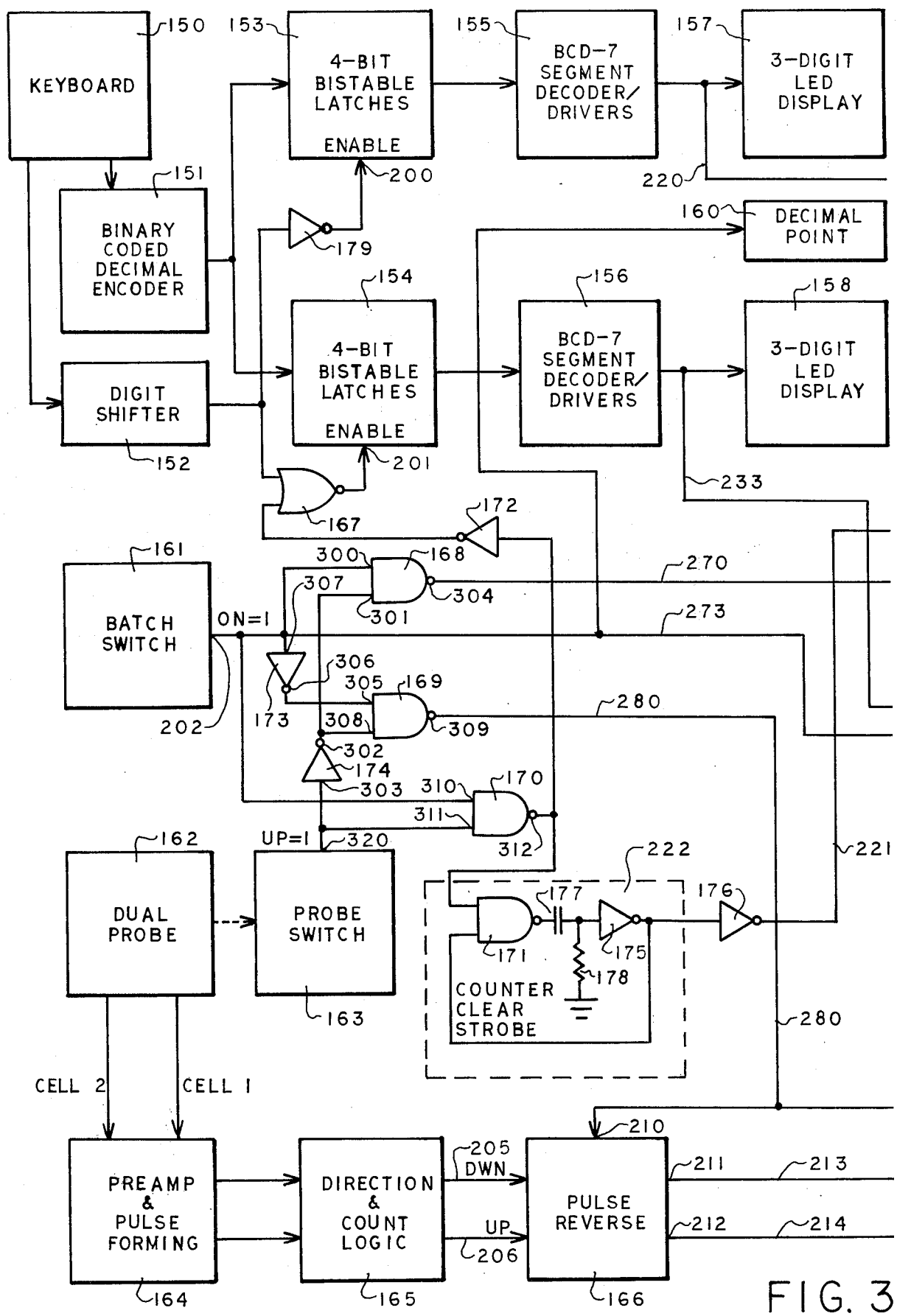
FIG. 3 is a detailed block diagram partially in schematic form of the first half portion of an automatic film searching and retrieval system and embodying the present invention.
Figure 4:
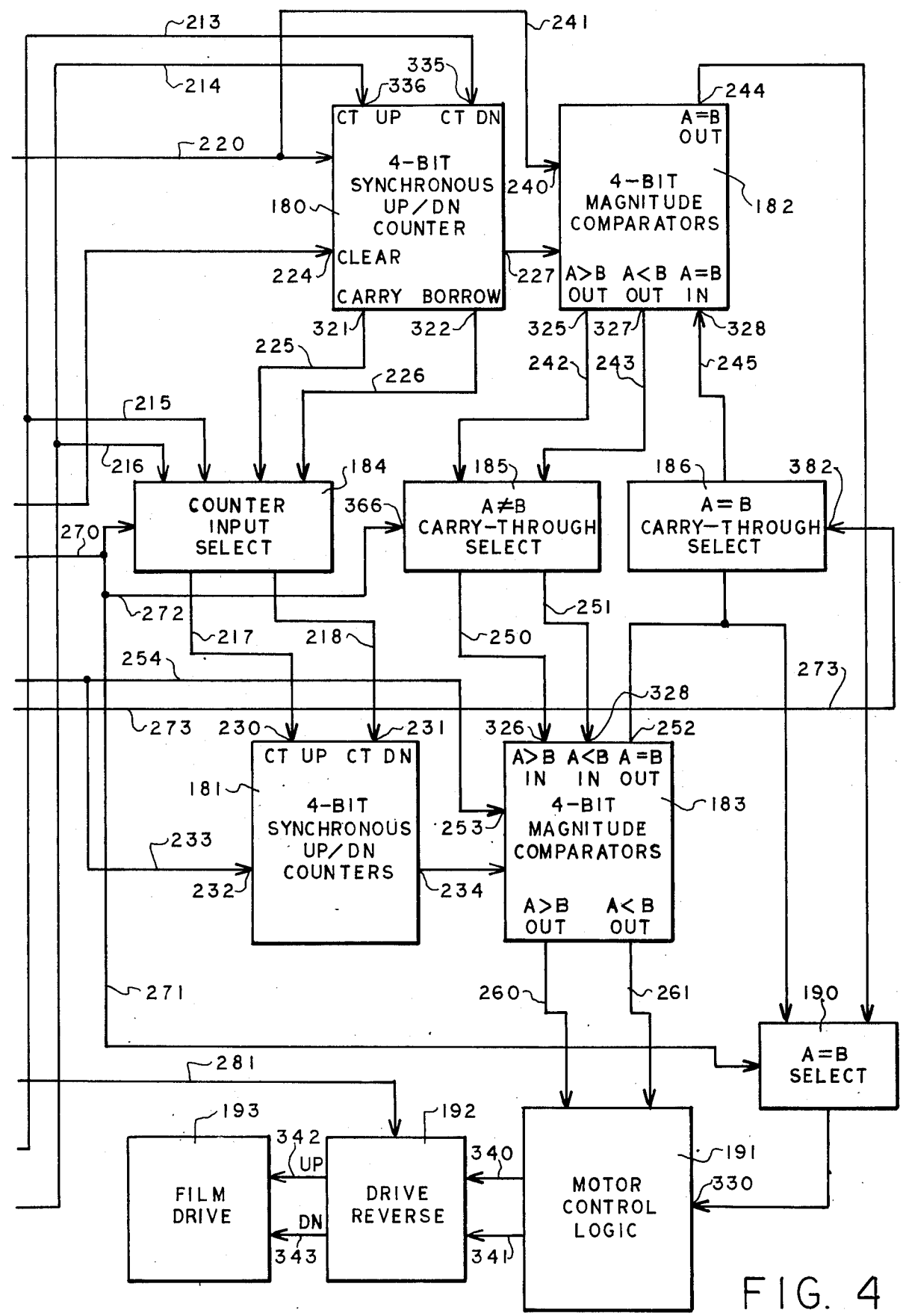
FIG. 4 is a detailed block diagram of the other second half portion of an automatic film searching and retrieval system embodying the present invention.

FIGS. 3 and 4, when placed side-by-side, show a detailed block diagram, partially in schematic form, of an automatic film searching and retrieval system embodying the present invention and which is capable of properly locating a preselected information bearing element or document image on a microfilm regardless of the particular format the document image are arranged in as represented in FIGS. 2A-2D. The system of FIGS. 3 and 4 comprises a keyboard 150, a binary coded decimal encoder 151, a digit shifter 152, four-bit bistable latches 153 and 154, binary coded decimal-7 segment decoder drivers 155 and 156, and a display comprising a first 3-digit light emitting diode display 157 and a second 3-digit light emitting diode display 158. The system of FIGS. 3 and 4 also includes a light emitting diode decimal 160 which divides the three digit display 157 from the three digit display 158 in a manner to be described hereinafter, actuating means or batch switch 161, a dual probe 162 which may comprise the marker sensor of FIG. 9, probe switch 163 which may comprise the microswitch 120 of FIG. 9, a preamp and pulse forming circuit 164, direction and count logic 165, and a pulse reverse 166.

The system of FIGS. 3 and 4 also includes NOR gate 167, NAND gates 168, 169, 170 and 171, inverters 172-176 and 179, capacitor 177, and resistor 178. The system further includes an up/down counter comprising a first four-bit synchronous up/down counter 180 and a second four-bit synchronous updown counter 181, a four-bit magnitude comparator comprising a first four-bit magnitude comparator 182 and a second four-bit magnitude comparator 183, a counter input select 184, an A≠B carry-through select 185, and an A=B carry-through select 186.

Lastly, the system includes an A=B select 190, motor control logic 191, drive reverse 192, and a film drive 193.

Keyboard 150 is coupled to the binary coded decimal encoder 151. Keyboard 150 includes 10 keys numbered 0–9 which may be depressed for selecting the target element number representing the information element or image to be inspected when the system is to act upon 16 mm. film having images thereon in the normal format as shown in FIGS. 2A and 2B or film having information elements in the Duo-Duplex format as shown in FIG. 2D. Keyboard 150 may also be utilized for selecting the target group number representing the preselected group of images and the target element number of the particular image to be inspected within the preselected group. The system logic includes a counter and comparator for acting upon the target numbers and the current numbers having six digits. When a group is to be preselected and then an element within the group, the first three digits entered by the keyboard are treated as the group target number and the last three digits are treated as the element target number within the target group. The binary coded decimal encoder 151 decodes the decimal representation of the target numbers into four bit binary coded decimal words.

The binary decimal coded encoder 151 is coupled to the four-bit bistable latches 153 and 154 which serve as a storing means for storing the target numbers in binary coded decimal form. Latch 153 includes an enable input 200 which is coupled to digit shifter 152. Digit shifter 152 is in turn coupled to the keyboard 150. When a target number is to be entered into the bistable latches 153 and 154 digit shifter 152 provides a logical 1 level at enable input 200 of latch 153 to enable latch 153 to receive the last three entered digits of the target number. In a similar manner, latch 154 has an enable input 201 which is coupled to NOR gate 167. NOR gate 167 is provided in association with NAND gate 170 to disable latch 154 so that the batch target number cannot be changed when a batch has been selected and the system is set to search for an image within the selected batch. Latch 154 receives the first three digits entered by the keyboard 150. Because the target numbers are entered serially by keyboard 150, the first three digits entered will represent the 100,000's, 10,000's and 1,000's digits and will reside within the latch 154. The last three digits to be entered will represent the 100's, 10's and 1's which will reside in bistable latch 153. When a batch is to be selected and then a particular image within the batch, latch 154 will contain the 100's, 10's and 1's digits of the batch target number and latch 153 will contain the 100's, 10's and 1's digits of the image target number to be selected from the selected batch.

The binary coded decimal–7 segment decoder drivers 155 and 156 couple the latches 153 and 154 respectively to the 3-digit light emitting diode displays 157 and 158 respectively. The decoder drivers decode the four bit binary coded decimals into 7 segment signals for driving each 7 segment light emitting diode element of the displays 157 and 158. As a result, the display comprising the displays 157 and 158 provides the visual 6-digit display of the target numbers. When the system operates in a non-batch mode, all 6 digits relate to a target image number. In the batch mode, the batch switch 161 is turned on and provides at output 202 a logical 1 signal which is coupled to the decimal point 160. The logical 1 signal received by the decimal point, which is a light source comprising a light emitting diode, causes the light emitting diode to emit light and to provide a decimal point in the center of the 6 digit display. As a result, the 3 digits of display 158 to the left of the decimal point provide the display of the batch target number in 100's, 10's and 1's, and the 3 digits of display 157 to the right of the decimal point provide the display of the image target number within the target batch and is represented by 100's, 10's, and 1's.

The dual probe 162 is coupled to the preamp and pulse forming circuit 164. As previously mentioned, the preamp and pulse forming circuit 164 squares the wave forms provided by the dual probe and is coupled to the direction and count logic 165 which determines the direction in which the film is being driven and provides a down pulse on line 205 for each marker that is sensed while the film is being driven in the down direction and an up pulse at line 206 for each marker which is sensed while the film is being driven in the up direction. Pulse reverse 166 serves as an interface for interfacing the up and down pulses provided by the marker sensor of the dual probe 162 to the up/down counter comprising counters 180 and 181. As previously mentioned, the second set of images with the Duo-Duplex type film are numbered consecutively in a direction opposite the direction in which the first set of images are numbered. Therefore, it is necessary to reverse the up and down pulse leads 206 and 205 to the counters each time the dual probe transfers from sensing one set of markers to the other set of markers. The pulse reverse 166 has outputs 211 and 212. It directly couples line 205 to output 211 and line 206 to line 212 when the marker sensor is sensing the first set of markers. When the marker sensor senses the second set of markers, pulse reverse 166 couples line 205 to output 212 and line 206 to output 211. Outputs 211 and 212 are coupled directly to counter 180 and are selectively coupled to counter 181 by the counter input select 184 whose function will be described subsequently.

Pulse reverse 166 has a control input 210 which is coupled to NAND gate 169. NAND hate 169 controls pulse reverse 166 in a manner to be hereinaafter described.

As in prior art systems. the automatic retrieval system of the present invention includes a synchoronous u/down counter for counting the film images as they are driven and sensed and a comparator for comparing the target numbers to the current number provided by the up/down counter in order to locate the desired image frame. However, the counter and comparator of the present invention are associated with counter select and comparator select means respectively which separate the functions of the counters and comparators in order to render the system applicable for the batch mode of operation.

The counter 180 comprises a first counter which provides 1's, 10's and 100's digits of the current image numbers for the non-batch modes and 1's, 10's and 100's digits of the image current numbers for the batch mode when searching for a selected image within the selected batch. To this end, counter 180 is coupled to the coder drivers 155 by line 220 for receiving the image frame number from which it is to count from. Counter 180 is coupled to the pulse reverse 166 by lines 213 and 214. Line 214 provides the up counting pulses and line 213 provides the down counting pulses. Counter 180 is also coupled to the counter clear by inverter 176. The counter clear 222 comprises NAND gate 171, capacitor 177, resistor 178, and inverter 175 to the clear input 224 of counter 180. The counter clear 222 clears counter 180 when the system is in the batch mode and the marker sensor is moved from its down position to its up position. Counter 180 has a carry output 321 coupled to the counter input select 184 by line 225 and a borrow output 322 coupled to counter input select by line 226. Lastly, counter 180 has an output 227 which is coupled to comparator 182 for providing comparator 182 with the 1's, 10's and 100's digits of the image current number in the non-batch mode and 1's, 10's and 100's digits of the current image number when in the batch mode.

Counter 181 contains the 1000's, 10,000's and 100,000's current image number digits when the system in in the non-batch mode, and 1's, 10's and 100's digits of the batch current number when the system is in the batch mode. Counter 181 has its up count input 230 coupled to the counter input select 184 by line 217 and its count down input 231 coupled to the counter input select 184 by line 218. Also, up/down counter 181 has an input 232 coupled to the decoder drivers 156 by line 233. Lastly, counter 181 has an output 234 coupled to comparator 183 to provide comparator 183 with the 1000's, 10,000's and 100,000's digits of the current image number when the system is operative in the non-batch mode, and the 1's. 10's and 100's digits representing the current batch number when the system is operative in the batch mode.

Counter input select 184 couples the counters 180 and 181 directly together to operate as a single counter when the system is operative in the non-batch mode. When the system is operaative in the batch mode, counter input select 184 causes the up and down pulses to be transferred from the pulse reverse 166 to counter 181 when the system is searching for the preselected batch.

In a similar manner, the comparator which comprises comparator 182 and comparator 183 is also divided during the batch mode. Comparator 182 compares the 1's, 10's and 100's digits of the image target numbers for both the non-batch and batch modes. Comparator 182 has an input 241 and 220. Comparator 182 also has an $A>B$ output 325 and an $A<B$ output 327 which are coupled to the $A\neq B$ carry-through select 185 by lines 242 and 243, respectively. Comparator 182 also has an $A=B$ output 244 coupled to the $A=B$ select 190. Lastly, comparator 182 has an $A=B$ input 328 coupled to the $A=B$ carry-through select 186 by line 245.

Comparator 183 compares the 1000's, 100,000's and 100,000's digits of the image target numbers to the 1000's, 10,000's and 100,000's digits of the image current numbers provided by counter 181 when the system is operative in the non-batch mode. When the system is operative in the batch mode, comparator 183 compares the 1's, 10's and 100's digits of the target batch number to the 1's, 10's and 100's digits of the current batch numbers provided by the up/down counter 181. Comparator 183 has an $A>B$ input 326 and an $A<B$ input 328 coupled to the $A\neq B$ carry-through select 185 by lines 250 and 251 respectively. Comparator 183 also has an $A=B$ output 252 which is coupled to the $A=B$ carry-through select 186 and to the $A=B$ select 190. Comparator 183 also has an input 253 coupled to the decoder and drivers 156 by line 233 and 254. Lastly, comparator 183 has an $A>B$ output and an $A<B$ output coupled to the motor control logic 191 by lines 260 and 261 respectively.

The $A\neq B$ carry-through select 185, $A=B$ carry-through select 186 and the $A=B$ select 190 function as a comparator select means when the system is established in the batch mode. When the system is established in the batch mode, comparator 183 is utilized for searching for the preselected batch. To this end, $A=B$ select 190 couples output 252 of comparator 183 to motor control logic 191. When a desired image is being located within the preselected batch $A=B$ select 190 couples output 244 of comparator 182 to the motor control logic 191. Thus, comparator 182 is utilized for searching for the preselected image within the preselected group. During the batch mode of operation the $A\neq B$ carry-through select 185 and $A=B$ carry-through select 186 isolates the two comparators from each other so that each can function independently.

When the system is in the normal of Duo-Duplx modes, the $A\neq B$ carry-through select 185 and the $A=B$ carry-through select 186 couple the two comparators together logically so that they operate as one comparator. During these modes of operation, output 244 of comparator 182 is coupled to the motor control logic by $A=B$ select 190. The $A=B$ select 190 is under the control of NAND gate 168 and is coupled to NAND gate 168 by lines 270 and 271. The $A\neq B$ carry-through select is also under the control of the NAND gate 168 as coupled to NAND gate 168 by lines 270 and 272. The $A=B$ carry-through select operates under the control of the batch switch 161 and is coupled thereto by line 273.

The motor control logic 191 controls the direction and speed of the film drive 193. It determines from the outputs of the comparators whether the film is to be driven in the forward or reverse direction for locating the preselected document or group of documents and is caused to stop when it receives a signal from the $A=B$ select indicating that the current number is equal to the traget number and that the preselected image or group has been located. Motor control logic of this type is well known in the art and may be found, for example, in the patent to Huston and Murre, U.S. Pat. No. 3,941,978, which issued Mar. 2, 1976, and which is assigned to the assignee of the present invention, Drive reverse 192 is coupled to NAND gate 169 by lines 280 and 281 and is caused to reverse the normal direction of the film drive when the marker senses the second set of markers when the system is in the Duo-Duplex mode.

The circuitry which controls the counter input select 184, $A\neq B$ carry-through select 185, $A=B$ carry-through select 186, $A=B$ select 190, pulse reverse 166, and drive reverse 192 to establish the system in its various operative modes comprises NAND gate 168, NAND gate 169, NAND gate 170, and inverters 172, 173 and 174. NAND gate 168 has an input 300 coupled to batch switch 161 at output 202 and another input 301 coupled to output 302 of inverter 174. Inverter 174 has an input 303 which is coupled to the probe switch 163. NAND gate 168 has an output 304 which is coupled to line 270.

NAND gate 169 has an input 305 which is coupled to output 306 of inverter 173 which has an input 307 coupled to the batch switch 161. NAND gate 169 has another input 308 which is coupled to output 302 of inverter 174 and an output 309 which is coupled to line 280.

NAND gate 170 has an input 310 coupled to the batch switch 161 and another input 311 coupled to probe switch 163. Lastly, NAND gate 170 has an output 312 which is coupled to inverter 172 and to the counter clear strobe 222.

The operation of the automatic film searching and retrieval system of the present invention will now be described for each of the operating modes.

THE NORMAL MODE

When the system is operative in the normal mode, it is acting upon film which has information bearing elements or document images which are arranged in the normal format as shown in FIGS 2A and 2B. Because the identifiable markers are at the top edge of the film, the marker sensor shown in FIG. 9 of the dual probe 162 is in its up position so that sensors 106 and 107 are aligned with the top edge identifiable markers. As a result, the probe switch provides at output 320 a logical 1 level signal. Also, because the system is being placed in a non-batch mode, batch switch 161 is turned off to provide at output 202 a logical 0 level signal.

The logical 0 level provided at output 202 of batch switch 161 and the logical 1 level provided at output 320 of probe switch 163 causes NAND gates 168, 169 and 170 to provide at their respective outputs a logical 1 level signal. Also, a logical 0 level signal is applied to line 273 which is coupled to output 202 of batch switch 161.

The logical 1 signal provided by NAND gate 168 and which is impressed upon line 270 is coupled to the counter input select 184, to the A≠B carry-through select 185 to the A=B select 190. The logical 1 level applied to the counter input select 184 causes it to couple line 225 to line 217 and line 226 to line 218. As a result, the carry output 321 of counter 180 is coupled to the count up input 230 of counter 181 and the borrow output 322 of counter 180 is coupled to the count down input 231 of counter 181.

Figure 7:
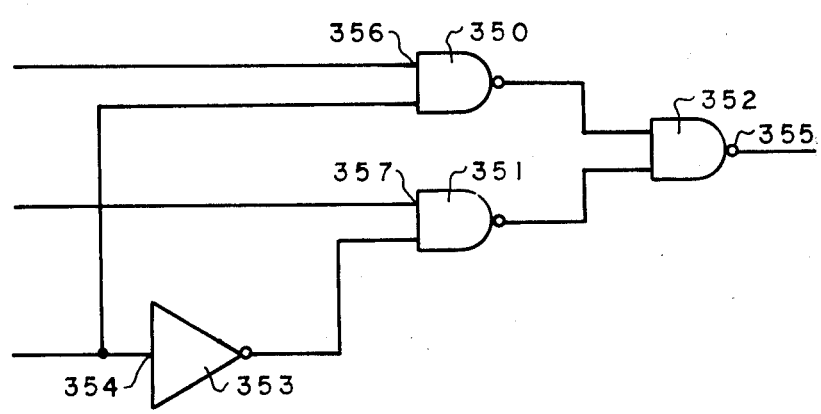
FIG. 7 is a schematic circuit diagram of a circuit which may be utilized for the A=B select and the counter input select shown in FIG. 4.

A circuit which may be utilized in the counter input select 184 is shown in FIG. 7. To provide the necessayr counter input select function the circuit of FIG. 7 must be duplicated. This comprises NAND gates 350, 351, and 352, and inverter 353. The control input is located at the input 354 of inverter 353. When the control input 354 receives a logical 1 level, output 355 of NAND gate 352 is effectively coupled to input 356 of NAND gate 350. When input 354 of inverter 353 receives a logical 0 level, output 355 of NAND gate 352 is effectively coupled to input 357 of NAND gate 351. Thus, in practicing the present invention, input 356 of NAND gate 350 may be coupled to line 226, input 357 of NAND gate 351 may be coupled to line 215, and output 355 may be coupled to line 218. Duplication of the circuit of FIG. 7 would therefore dictate that input 356 of NAND gate 350 be coupled to line 225 and input 357 of NAND gate 351 be coupled to line 216. Also, output 355 of NAND gate 352 would be coupled to line 217. As a result of the logical 1 level on line 270, the counter input select will function as previously described to couple lines 225 to line 217 and line 226 to line 218. Counters 180 and 181 are thus combined to function as a single 6 digit, four-bit synchronous up/down counter.

Figure 6:
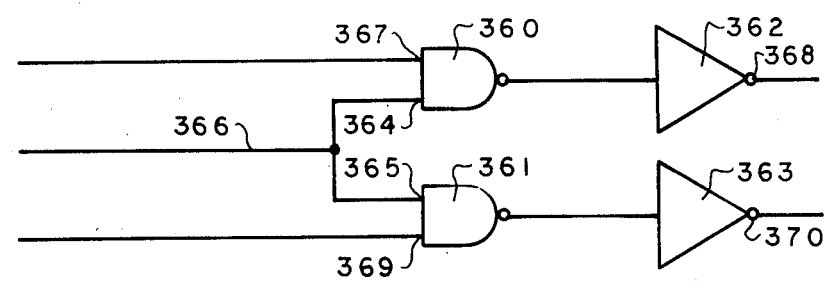
FIG. 6 is a schematic circuit diagram of the A≠B carry-through select of FIG. 4.

The logical 1 level provided by NAND gate 168 is also impressed upon the A≠B carry-through select 185 by lines 270 and 272. A circuit which may be utilized for the A≠B carry-through select 185 is shown in FIG. 6. It comprises NAND gates 360 and 361, and inverters 362 and 363. NAND gate 360 has an input 364 and NAND gate 361 has an input 365. Inputs 364 and 365 are coupled together and to a common input line 366 which comprises the control input of the circuit of FIG. 6. When common input 366 is a logical 1, the input 367 of NAND gate 360 is effectively coupled to output 368 of inverter 362. Also, input 369 of NAND gate 361 is effectively coupled to output 370 of inverter 363. When control input 366 receives a logical 0 level, output 368 of inverter 362 and output 370 of inverter 363 are forced to a logical 0 level.

In practicing the instant invention, the input 367 of NAND gate 360 is coupled to line 243 and input 369 of NAND gate 361 is coupled to line 242. Output 368 of inverter 362 is coupled to line 251 and output 370 is coupled to line 250. Input 366 is coupled to line 272. As a result of the logical 1 level signal on line 272, the A≠B carry-through select will couple line 243 to line 251 and line 242 to line 250. As a result, the A>B output 325 of comparator 182 is coupled to the A>B input 326 of comparator 183 and the A<B output 327 of comparator 182 is coupled to the A<B input 328 of comparator 183.

Figure 5:
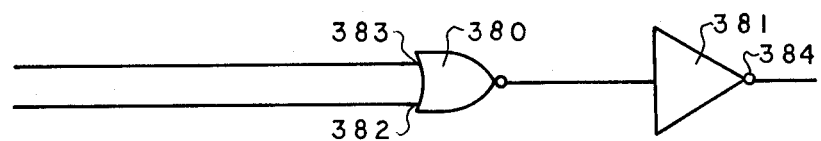
FIG. 5 is a circuit diagram of the A=B carry-through select of FIG. 4.

The logical 0 level provided by output 202 of batch switch 161 which is impressed upon line 273 is received by the A=B carry-through select 186. A suitable circuit which may be utilized for the A=B carry-through select 186 in practicing the present invention is shown in FIG. 5. It includes a NOR gate 380 and an inverter 381. NOR gate 380 includes an input 382 which constitutes the control input of the A=B carry-through select 186. NOR gate 380 has another input 383 which is coupled to the A=B output 252 of comparator 183. Inverter 381 has an output 384 which is coupled to line 245 which is coupled to the A=B input 328 of comparator 182. When control input 382 of the A=B carry-through select receives a logical 1 signal, output 384 of inverter 381 is forced to a logical 1 level. When control input 382 receives logical 0 level signal, input 383 of NOR gate 380 is coupled to output 384. Thus, as a result of the logical 0 level signal provided by the batch switch 161 which is impressed upon line 273, the A=B carry-through select 186 will couple the A=B output 252 of comparator 183 to the A=B input 328 of comparator 182. This completes the necessary connections between comparator 182 and comparator 183 to cause the comparators to function as a single 6 digit, four-bit magnitude comparator.

The A=B select 190 also receives the logical 1 level provided by NAND gate 168 which is impressed upon line 270. A=B select 190 is coupled to line 270 by line 271. A suitable circuit which may be utilized for the A=B select in practicing the present invention has been previously described and is shown in FIG. 7. In this application of FIG. 7, the control input 354 of inverter 353 is coupled to line 271. Input 356 of NAND gate 350 is coupled to the A=B output 244 of comparator 182 and input 357 of NAND gate 351 is coupled to the A=B output 252 of comparator 183. Lastly, output 355 of NAND gate 352 is coupled to the input 330 of the motor control logic 191. As a result of the logical 1 level received by the A=B select 190, output 244 of comparator 182 will be coupled to input 330 of the motor control logic 191. As a result of this last connection, the 6 digit magnitude comparator which comprises comparators 182 and 183 will have an output at output 244 of comparator 182 which is coupled to the motor control logic for controlling the motor control logic.

Figure 8:
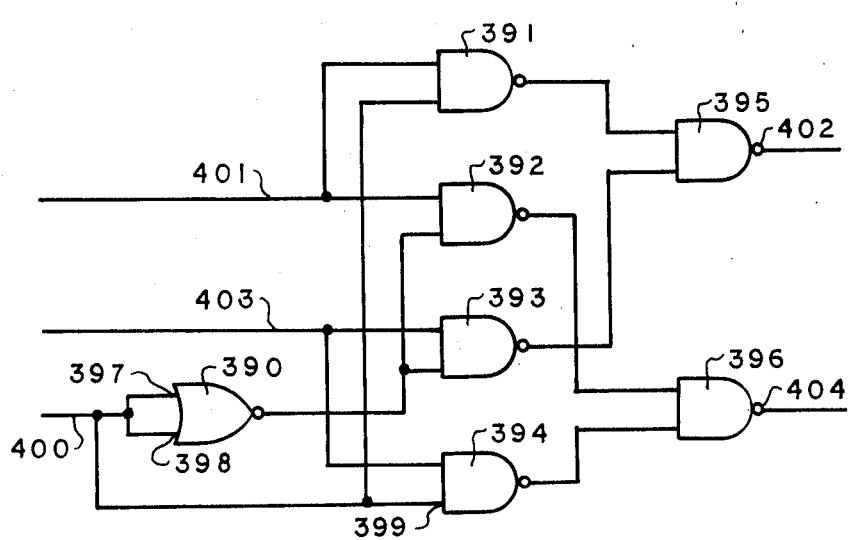
FIG. 8 is a schematic circuit diagram of a circuit which may be utilized for the drive reverse of FIG. 4 and the pulse reverse of FIG. 3.

The logical 1 level provided by NAND gate 169 which is coupled to line 280 is received by both the pulse reverse 166 and the drive reverse 192. FIG. 8 shows a schematic circuit diagram of a suitable circuit which may be used for the pulse reverse 166 in practicing the present invention.

The circuit of FIG. 8 comprises NOR gate 390 and NAND gate 391–396. NOR gate 390 has a pair of inputs 397 and 398 which are coupled together and coupled to input 399 of NAND gate 394. Inputs 397, 398 and 399 are coupled in common to line 400 which constitutes the control input of the circuit. When the control input 400 receives the logical 1 level signal, input line 401 is coupled to output 402 of NAND gate 395 and input 403 is coupled to output 404 of NAND gate 396. When the control input 400 receives a logical 0 level, input 401 is coupled to output 404 of NAND gate 396 and input 403 is coupled to output 402 of NAND gate 395. In practice, input 401 is coupled to line 205 and input 403 is coupled to line 206 while output 402 is coupled to line 213 and output 404 is coupled to line 214. As previously explained, the direction and count logic 165 provides a down pulse on line 205 as each marker is sensed and as the film is driven in the reverse direction from the right to the left and an up pulse on line 206 as each marker is sensed and as the film is driven in the forward direction from left to right as depicted in FIG. 1. Because the images are numbered for identification in increasing order from the right to the left, it is necessary to couple line 205 to line 213 so that the down pulses may be received at the count down input 335 of counter 180 and line 206 coupled to line 214 for providing the up pulses to the count up input 336 of counter 180. When the circuit of FIG. 8 receives the logical 1 level signal at its control input, this straight line connection will be obtained.

In a similar manner, the circuit of FIG. 8 may be utilized for the drive reverse 192. Here, line 340 is coupled to input 401, line 341 is coupled to input 403, output 402 is coupled to line 342, and output 404 is coupled to line 343. When the circuit of FIG. 8 receives the logical 1 level, it will couple line 340 to line 342 and line 341 to line 343 to cause the film drive 193 to drive the film in a direction from the left and the right as the forward direction for increasing identification numbers by command signals over line 342 and to cause the drive reverse to cause the film drive to drive the film in a direction from right to left or in the reverse direction for decreasing identification numbers by command signals over line 343.

Lastly, the logical 1 level provided at output 312 of NAND gate 170 is impressed upon inverter 172 and the counter clear strobe 222. Counter clear strobe 222 is coupled to the clear input 224 of counter 180 and responsive to the signal which is generated by the counter clear strobe 222 responsive to the logical 1 level at output 312 of NAND gate 170 causes the counter to clear. The logical 1 level impressed upon inverter 172 is inverted by inverter 172 and impressed upon NOR gate 167. This enables latch 154 so that the first three digits of the image target number may be entered. As previously explained, these three digits represent the 100,000's, 10,000's and 1000's digits.

The system is now ready for operation in the normal mode. The operator presses the appropriate keys on keyboard 150 to select the preselected image to be inspected. The target number of the preselected image is loaded into latches 153 and 154, is decoded by the decoders 155 and 156 and displayed on the display comprising displays 157 and 158. The comparator comprising comparators 182 and 183 compares the target number to the current number and determines whether the target number is greater than the current number or less than the current number. The comparator via lines 260 and 261 provides the motor control logic 191 with appropriate signal levels to cause the motor control logic to provide the film drive 193 with commands to cause the film drive to drive the film in the proper direction towards the preselected image. When the preselected image is located, the comparator determines that the target number is equal to the current number and provides at output 244 a signal which is impressed upon input 330 of the motor control logic 191 through the A=B select 190 to cause the film drive to stop. Now, the preselected image has been located.

DUO-DUPLEX MODE

When the system is to operate in the Duo-Duplex mode on film which has information bearing elements or images thereon in a Duo-Duplex format as shown in FIG. 2D, the system operates in the same manner as in the normal mode for locating information bearing elements within the first set of elements. In other words, should the operator desire to locate any one of the images 70–75 which has associated with them the first set of markers 82–87 at the top edge of the film, the system will operate in the same manner as previously described for the normal mode of operation. However, when the operator wishes to locate a preselected image in the second group which comprises images 76–81, the marker sensor of FIG. 9 must be lowered to its down position so that sensors 106 and 107 are aligned with the markers which are at the bottom edge of the film and which are associated with the second set of images.

When the marker sensor is lowered, probe switch 163 will provide at output 320 a logical 0 signal. Batch switch 161 will remain off and provide at output 202 a logical 0 signal. In reponse to the logical 0 signal at output 202 of batch switch 161 and the logical 0 signal at output 320 of probe switch 163, NAND gate 168 will provide a logical 1 level at output 304, line 273 will contain a logical 0 level signal, NAND gate 169 will provide a logical 0 level signal at output 309, and NAND gate 170 will provide a logical 1 level signal at output 312. In other words, the only change in the levels of the control signals is the control signal provided by NAND gate 169 at its output 309. The logical 0 signal at output 309 of NAND gate 169 is impressed upon line 280 and ultimately upon pulse reverse 166 and the drive reverse 192. As previously described in relation to the circuit of FIG. 8, a logical 0 level signal on line 180 will cause the pulse reverse to couple line 205 to line 214 and line 206 to line 213. In a similar manner, drive reverse 192 will couple line 342 to line 341 and line 343 to line 340.

These connections are necessary because the second set of images in the Duo-Duplex format are numbered consecutively in increasing order in a direction opposite that for the identification numbering of the images of the first or top set of images. Therefore, it is necessary to provide the counter with an up counting pulse as each second set identification marker is sensed and as the film is being driven in a direction from the right to the left and a down counting pulse to the count down input 335 of counter 180 as each second set marker is sensed while the film is driven in a direction from the left to the right. Because the second set of images are numbered in reversing order compared to the first set of images, the drive reverse 192 must reverse the film drive command to the film drive 193. By coupling lines 340 and 341 to lines 342 and 343 in the manner just described, the proper drive command from the motor control logic 191 will be provided to the film drive 193. In all other respects, the operation of the system remains the same as that for the mormal mode of operation.

BATCH MODE

When the sytem is placed in the batch mode of operation, the system operates upon film as shown in FIG. 2C. As previously explained, the images are grouped in batches and each is consecutively numbered within its own group. At the bottom edge of the film and associated with each of the first images of each group is a group identifiable marker. At the top edge of the film and associated with each image is an image identifiable marker. Both the images and the groups are numbered consecutively in increasing order from the right to the left so that the forward drive direction corresponds to that shown in FIG. 1 by arrow 13.

When the system is placed in the batch mode, batch switch 161 is turned on to thereby provide at output 202 a logical 1 signal. It will be customary for an operator to locate the preselected group first and then to locate the preselected image within the preselected group. In order to locate the preselected group, the marker sensor shown in FIG. 9 must be lowered into its down position to align the sensors 106 and 107 with the group markers at the bottom edge of the film. As a result, probe switch 163 will provide at output 320 a logical 0 level signal.

As a result of the batch switch being turned on and the probe switch being down providing a logical 0 signal at output 320, NAND gate 168 will provide at output 304 a logical 0 signal, line 273 will contain a logical 1 level signal, NAND gate 169 will provide at output 309 a logical 1 level signal, and NAND gate 170 will provide at output 312 a logical 1 level signal.

The logical 0 level signal provided by NAND gate 168 at output 304 is impressed upon line 270 and is received by the counter input select 184, the A≠B carry-through select 185, and the A=B select 190. In the case of the counter input select 184, the logical 0 level signal received by it from line 270 causes the counter input select to couple lines 216 and 215 to lines 217 and 218 respectively. This couples the up and down pulses from the pulse reverse 156 to the count up input 230 and count down input 231 of counter 181.

The logical 0 level signal on line 270 is impressed upon the A≠B carry-through select via line 272 at input 366. In response to the logical 0 level signal at its input, the A≠B carry-through select forces a logical 0 signal upon lines 250 and 251 so that the A>B input 326 and the A<B input 328 are at logical 0. Lastly, the logical 0 level signal on line 270 is impressed upon the A=B select 190 which causes the A=B select 190 to couple the A=B output 252 of comparator 183 to input 330 of the motor control logic 191.

The logical 1 level signal provided at output 202 of batch switch 161 which is impressed upon line 273 is received by the A=B carry-through select 186 at input 382. The logical 1 level signal received at its input causes the A=B carry-through select 186 to provide the logical 1 level signal on line 245 which is received at the A=B input 328 of comparator 182. In essence, connections and logic levels established by the counter input select 184, the A=B carry-through select 186, the A≠B carry-through select 185, and the A=B select 190 separate the counter 180 from the counter 181 and the comparator 182 from the comparator 183 so that the counter 181 and the comparator 183 are utilized for locating the preselected batch of images.

The logical 1 level signal provided at output 309 of NAND gate 169 which is impressed upon line 280 establishes the straight line coupling of line 205 to line 213, line 206 to line 214, line 340 to line 342, and line 341 to line 343 in a manner previously described. These connections are necessary inasmuch as the batches and images within each batch are numbered in increasing order in the same direction as the images are numbered in the normal type of format.

The logical 1 level signal provided at output 312 of NAND gate 170 causes NAND gate 167 to enable latch 154. This allows the group target number, which is a three digit number, to be entered into latch 154 and displayed on display 158.

Lastly, the logical 1 level signal provided at output 202 of batch switch 161 is coupled to the decimal point 160 which causes the light emitting diode comprising the decimal point to be energized. This separates the three left hand digits from the three right hand digits of the display. The three digits to the left of the decimal point displayed on the display 158 will contain the batch target number and the three digits to the right of the decimal point will contain the three decimal target image number which identifies the preselected image to be located within the preselected group.

When the operator wishes to locate a preselected batch of elements and a preselected element within the batch, the batch target number is first entered via the keyboard which is shifted from the binary coded decimal encoder 151 to latch 154 through decoder and drivers 156 to display 158. The next three digits which are entered by the keyboard represent the target number of the image to be located within the preselected batch. This three digit number is loaded into latch 153, is decoded by decoder and drivers 155, and displayed on display 157 to the right of the decimal point. When the search for the preselected batch is initialized, the up and down counting pulses are applied to counter 181 through the counter input select 184. Comparator 183 compares the target number of the preselected group which it receives from the decoder drivers 156 via line 233 to the current group number to provide the motor control logic 191 with appropriate control signals to cause it to control the film drive for driving the film in the proper direction towards the preselected group of documents. When the current batch number equals the target batch number, comparator 183 will provide at output 252 a control signal which is impressed upon the motor control logic input 330 through A=B select 190. The motor control logic will then cause the film drive to stop at the preselected group of elements. Because the group identification markers are associated with the first element of each group, the film will be stopped such that the first image of the preselected group will be located.

Now that the preselected batch has been located, it is necessary to raise the marker sensor of FIG. 9 to align the snesors 106 and 107 with the first group of markers which are associated with each image. When this is done, probe switch 163 will provide at output 320 a logical 1 level signal. Now, there will be a logical 1 level signal at output 202 of batch switch 161 and at output 320 of probe switch 163. As a result, NAND gate 168 will provide at output 304 a logical 1 level signal, line 273 will still maintain a logical 1 level signal, NAND gate 169 will provide at output 309 a logical 1 level signal, and NAND gate 170 at output 312 will provide a logical 0 level signal.

The logical 1 level signal provided by NAND gate 168 at output 304 is impressed upon line 270 and received by the counter input select 184, A≠B carry-through select 185, and the A=B select 190. As a result, lines 225 and 226 are coupled to lines 217 and 218 respectively by the counter input select 184, lines 242 and 243 are coupled to lines 250 and 251 by the A≠B carry-through select 185 and output 244 of comparator 182 is coupled to input 330 of the motor control logic 191 by the A=B select 190. All of this occurs in the manner as previously described.

The logical 1 level signal maintained on line 273 is impressed upon A=B carry-through select 186. This forces the A=B carry-through select 186 to provide a logical 1 level signal at the A=B input 328 of comparator 182. As a result of these connections and logic levels, counter 180 is utilized along with comparator 182 for locating the preselected image in the preselected group. Only counter 180 is utilized because it is a three digit counter and the target number of the preselected image is a three digit number. Comparator 182 is isolated from comparator 183 because of the logical 1 level impressed upon its A=B input 328.

The logical 1 level signal provided by NAND gate 169 at output 309 and impressed upon line 280 maintains the straight line connection through pulse reverse 166 and drive reverse 192. The logical 0 level signal provided at output 312 of NAND gate 170 is inverted by inverter 172 and impressed upon NOR gate 167. This disables latch 154 so that the preselected batch number cannot be changed or a new batch number entered while the preselected image is being searched. Also, the logical 0 level signal provided at output 312 of NAND gate 170 causes the counter clear strobe 222 to clear counter 180 so that the count accumulated in counter 180 during movement of the sensor may be cleared.

The image target number representing the preselected image to be inspected within the preselected batch has already been entered by the keyboard, displayed on the display 157, and impressed upon comparator 182 by lines 220 and 241 at input 240. Counter 182 has been cleared and will start counting from 0 inasmuch as the images within each group are consecutively numbered in increasing order from 1. When the search is initialized, the comparator 182 compares the image target number to the image current number and when they are equal, will provide at output 244 a signal which is received by input 330 of motor control logic 191 through the A=B select 190. This will cause the motor control logic to stop the film drive 193 and the preselected image within the preselected batch has been located.

While a particular embodiment of the invention has been shown and described, modifications may be made, and it is intended in the appended claims to cover all such modifications which fall within the true spirit and scope of the invention.

I claim:

1. In an information retrieval system of the type which automatically locates preselected information bearing elements for inspection wherein the system includes drive means for driving the elements in first and second directions, wherein the information bearing elements are consecutively numbered for identification and comprise a first set of elements having increasing identification number when driven in the first direction and a second set of elements having increasing identification numbers when driven in the second direction, wherein each element is associated with a corresponding identifiable marker with the markers associated with the first set of elements comprising a first set of markers and the markers associated with the second set of elements being spaced from the first set of markers and comprising a second set of markers, and wherein the system includes a counting means for counting the elements for maintaining the location of the elements as the elements are driven, the improvement of a marker sensing system for sensing the first and second sets of markers and for properly controlling the drive means and the counting means comprising:

a marker sensor for sensing the first and second sets of markers and for providing up counting pulses and down counting pulses as the elements are driven;

a marker sensor detector for detecting which set of markers is being sensed; and first interface means coupled to said detector and selectively coupling said marker sensor to the counting means responsive to said detector for applying the up counting pulses to the counting means when said sensing means is sensing the first set of markers and as the elements are driven in the first direction, for applying the down counting pulses to the counting means when said sensing means is sensing the first set of markers and as the elements are driven in the second direction, for applying the up counting pulses to the counting means when said sensing means is sensing the second set of markers and as the elements are driven in the second direction and for applying the down counting pulses to the counting means when said sensing means is sensing the second set of markers and as the elements are driven in the first direction.

2. A system in accordance with claim 1 wherein the drive means drives the elements in the first and second directions under normal direction commands when said marker sensor senses the first set of markers and wherein the system additionally comprises second interface means coupled to said marker sensor detector and to the drive means for reversing the normal direction commands to the drive means responsive to said marker sensor detector when said marker sensor detects the second set of markers.

3. A system in accordance with claim 2 wherein said marker sensor comprises a displaceable probe, said probe being displaceable between a first position for sensing the first set of markers and a second position for sensing the second set of markers.

4. A system in accordance with claim 3 wherein said marker sensor detector includes a switch, and wherein said switch is actuated by said probe when said probe is in said second position to thereby detect when said probe is sensing the second set of markers.

5. In an information retrieval system of the type which locates selected information bearing elements for inspection, wherein the elements are numbered for identification and wherein the system includes a storage means for storing the identification number of the selected element to be inspected as a target number, drive means for driving the elements in first and second directions, a plural digit counter for counting the elements as they are driven and for providing current numbers, and a plural digit comparator for comparing the target number to the current numbers and for stopping the drive means when the current number is equal to the target number, the improvement of a control system for locating a desired individual group of elements from a plurality of such groups and thereafter, a selected element from the plurality of elements comprising the desired group, wherein the information bearing elements are grouped with the first element of each group being associated with an identifiable group marker, wherein the groups are assigned consecutive group numbers for identification, wherein the elements of each group are assigned consecutive numbers for identification within each group, wherein each element is associated with an element identifiable marker, wherein the element markers comprise a first set of markers and the group markers comprise a second set of markers, and wherein the first and second sets of markers are spaced apart, said control system comprising:

a marker sensor for sensing the first and second sets of markers and for providing up counting pulses and down counting pulses as the elements are driven;

a marker sensor detector for detecting which set of markers is being sensed for providing a first signal when said marker sensor is sensing the first set of markers and a second signal when said marker sensor is sensing the second set of markers;

counter select means coupled to said marker sensor detector for dividing the plural digit counter into a first counter and a second counter, for coupling said marker sensor to said first counter responsive to said first signal, and for coupling said marker sensor to said second counter responsive to said second signal; and comparator select means coupled to said marker sensor detector for dividing the plural digit comparator into a first comparator and a second comparator, said first comparator being coupled to said first counter for receiving the current element numbers, to said storage means for receiving the element target number, and having an output coupled to the drive means by said comparator select means responsive to said first signal, and said second comparator being coupled to said second counter for receiving the current group numbers, to said storage means for receiving the group target number, and having an output coupled to the drive means by said comparator select means responsive to said signal; whereby when said marker sensor senses the second set of markers to locate a selected group of elements, said marker sensor detector provides said second signal to cause said second counter, said second comparator, the storage means, and the drive means to locate the selected group of elements, and when said marker sensor senses the first set of markers to locate a selected element within the selected group, said marker sensor detector provides said first signal to cause said first counter, said first comparator, the storage means and the drive means to locate the selected element within the selected group.

6. A system in accordance with claim 5 wherein said marker sensor comprises a displaceable probe, said probe being displaceable between a first position for sensing the first set of markers and a second position for sensing the second set of markers.

7. A system in accordance with claim 6 wherein said marker sensor detector includes a switch, and wherein said switch is actuated by said probe when said probe is in said second position to thereby detect when said probe is sensing the second set of markers.

8. A system in accordance with claim 5 wherein said system includes a plural digit display coupled to the storage means for displaying the target numbers, an actuating means, and a digit display separating means coupled to said actuating means and associated with the plural digit display for separating the plural digit display into a first display and a second display responsive to said actuating means, and wherein said first display displays the target group number and wherein said second display displays the target element number within the target group.

9. A system in accordance with claim 8 wherein said digit display separating means comprises a light source to provide a decimal point within the plural digit display and wherein said light source is energized responsive to said actuating means.

* * * * *